United States Patent [19]

Lemmond

[11] 4,276,335

[45] Jun. 30, 1981

[54] ELECTRON BEAM MATRIX DEFLECTOR AND METHOD OF FABRICATION

[75] Inventor: Charles Q. Lemmond, Scotia, N.Y.

[73] Assignee: General Electric Company, Schenectady, N.Y.

[21] Appl. No.: 61,452

[22] Filed: Jul. 27, 1979

Related U.S. Application Data

[62] Division of Ser. No. 885,902, Mar. 13, 1978, Pat. No. 4,182,010.

[51] Int. Cl.³ .......................... B32B 3/10; H01J 9/18

[52] U.S. Cl. .................................. 428/131; 29/25.16; 29/25.18; 156/643; 156/663; 313/429; 428/136; 428/450; 428/472; 428/901

[58] Field of Search ............ 313/429; 29/25.18, 25.17, 29/25.16; 156/663, 644, 643; 428/131, 134, 901, 450, 472

[56] References Cited

U.S. PATENT DOCUMENTS

| | | | |
|---|---|---|---|
| 2,628,160 | 2/1953 | Stoakes | 156/663 |
| 2,806,958 | 9/1957 | Zunick | 156/663 |
| 3,534,219 | 10/1970 | Newberry | 313/429 |
| 3,534,219 | 10/1970 | Newberry | 313/429 X |
| 3,680,184 | 8/1972 | Greene | 29/25.18 |
| 3,687,664 | 8/1972 | Broadbent | 156/643 X |
| 3,713,921 | 1/1973 | Fleischer et al. | 156/643 |
| 3,802,972 | 4/1974 | Fleisher et al. | 156/644 |
| 4,160,311 | 7/1979 | Ronde et al. | 29/25.15 |
| 4,164,059 | 8/1979 | Esdonk | 29/25.18 |
| 4,182,010 | 1/1980 | Lemmond | 156/644 |

*Primary Examiner*—Thomas J. Herbert, Jr.
*Attorney, Agent, or Firm*—Geoffrey H. Krauss; James C. Davis; Marvin Snyder

[57] ABSTRACT

A matrix deflector, for deflecting an electron beam passing therethrough, is fabricated of a pair of members of photosensitive insulating material which are each exposed to a pattern of photons, and then developed to form a pattern of substantially parallel slots through each member; the members are positioned one above the other with the slots thereof orthogonally arrayed. The slots diverge in the direction of electron beam passage through each member to provide an exit aperture wider than the entrance aperture and prevent the deflected beam from striking the edge of the lens member at maximum deflection. The apertures form a set of parallel bars which are coated with a conductive material to facilitate production of deflecting electrostatic fields within each slot.

3 Claims, 9 Drawing Figures

Fig. 1
(PRIOR ART)
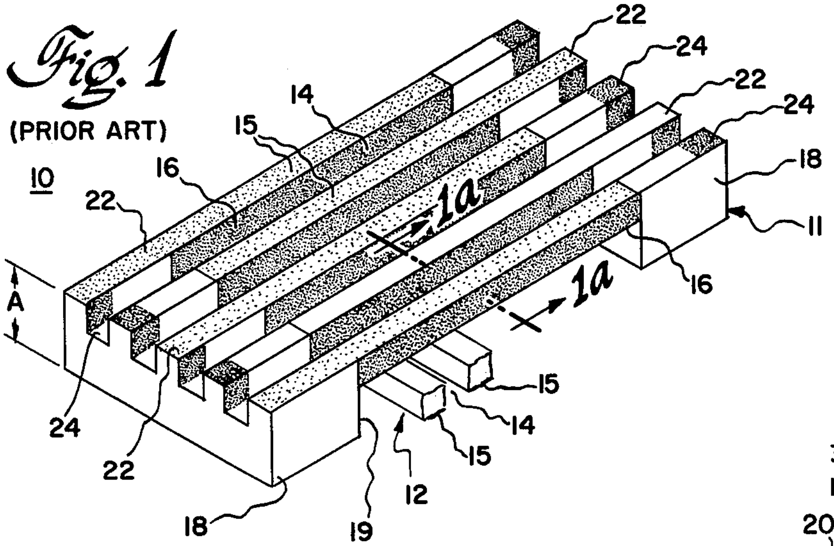
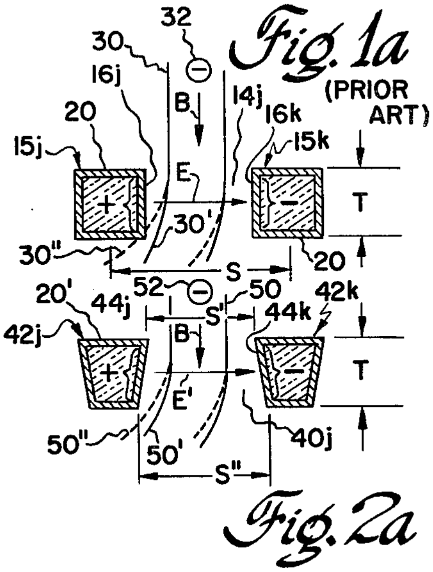
Fig. 1a (PRIOR ART)
Fig. 2a
Fig. 2
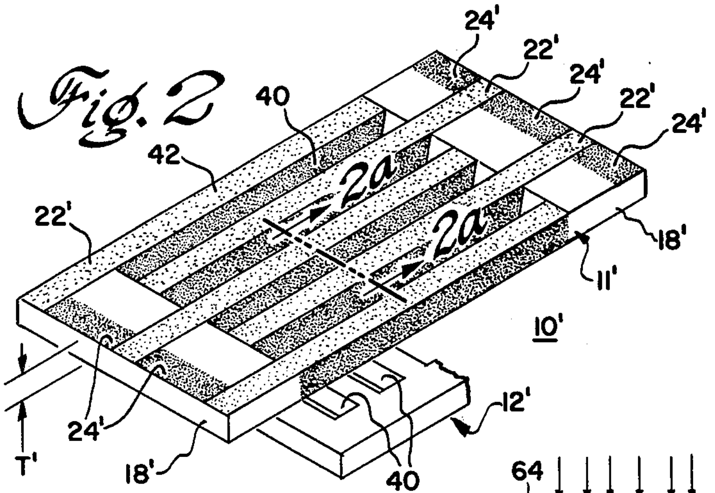
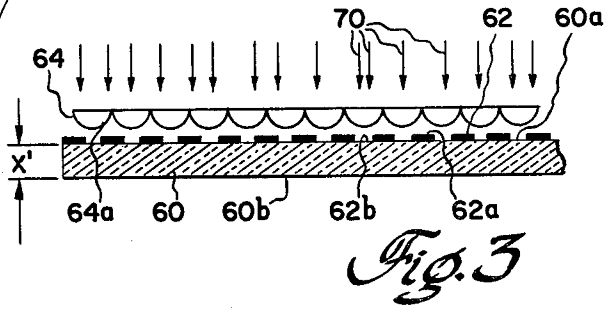
Fig. 3
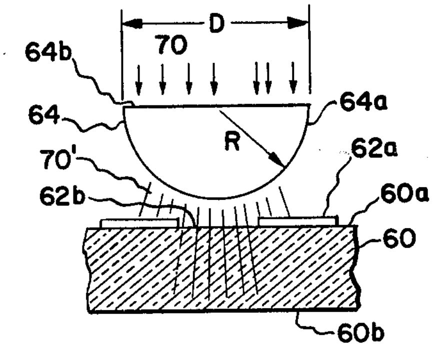
Fig. 4a
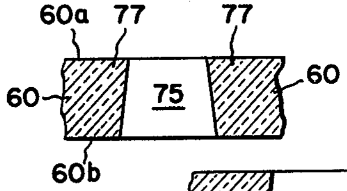
Fig. 4b
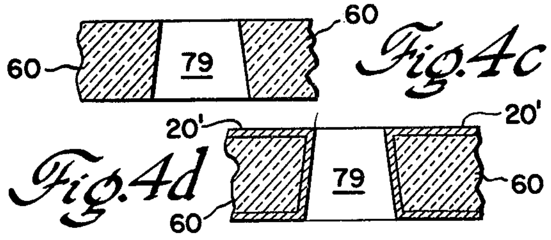
Fig. 4c
Fig. 4d

ELECTRON BEAM MATRIX DEFLECTOR AND METHOD OF FABRICATION

This is a division of application Ser. No. 885,902, filed Mar. 13, 1978, now U.S. Pat. No. 4,182,010.

BACKGROUND OF THE INVENTION

The present invention is directed towards electron beam matrix deflection systems and, more particularly, to a novel electron beam matrix deflector formed by photoetching techniques and having a diverging aperture for preventing impingement of the deflected electron beam against the matrix member structure.

In many electron beam systems, a matrix lens, such as described and claimed in U.S. Pat. No. 3,534,219, assigned to the assignee of the present invention and incorporated herein by reference, is utilized to focus and then accurately deflect an electron beam to precise position on a target positioned parallel to the plane of the matrix lens and on the opposite side thereof from an electron beam source. Typically, the matrix deflector consists of a square array of apertures or slots (such as an 18×18 array having 60 milli-inch spacing between centers of adjacent apertures) wherein the deflection matrix is formed by a pair of members each having a plurality of substantially parallel conductors, having the aforementioned center-to-center spacing, with the slotted apertures of each member being aligned essentially orthogonal to each other and to the direction of incidence of the electron beam. Typically, each aperture in each member has a depth of about 150 milli-inches to provide the required deflection for an electron beam realizing a spot size, upon impingment on a surface of the target, on the order of 2 microns. Such matrix deflector members are generally realized by machining a set of slots in a ceramic member to leave a complementary set of bars which are subsequently metallized to produce the conducting electrodes necessary for producing beam deflection fields within the slots. The machining of slots in a fired ceramic member is a difficult and costly process, particularly when high slot tolerances and relatively great depth of cut are required. Accordingly, a method for making an electron beam matrix deflector at a relatively low cost and in highly accurate manner (and the lenses made thereby) is highly desirable.

BRIEF SUMMARY OF THE INVENTION

In accordance with the invention, an electron beam matrix deflector is formed of a pair of slotted members overlapping one another and having the slots thereof disposed orthogonal to each other and to the direction of travel therethrough of an electron beam. Each member is formed of an insulative material which is developed after exposure to light photons, particularly in the ultraviolet region, and subsequently etched to form the slots therethrough. Conductive material is fabricated at least on the facing surfaces of each slot to facilitate formation of electrostatic fields within the slots for beam-deflecting purposes.

In a preferred embodiment, the slots have a smaller aperture dimension transverse to the entering electron beam relative to the slot dimension of the aperture for the exiting beam, whereby the slots themselves diverge through the thickness of the associated member to prevent the deflected electron beam from impinging upon the matrix member and the associated conductive patterns utilized thereon. A mask, having apertures therethrough in accordance with the array of slots to be fabricated in the matrix member, is positioned upon a surface of the lightsensitive material and a lens of essentially semicircular cross section is positioned above the centerline of each mask aperture to cause a planar illumination wavefront to diverge through the thickness of the member. The member is subsequently developed and etched to form the diverging slots therethrough and is thence coated at least on the interior surfaces of each of the bars forming a slot, with a conductive material.

Accordingly, it is an object of the present invention to provide a novel electron-beam matrix deflector having diverging apertures to substantially prevent impingement of a deflected electron beam upon the matrix lens members.

It is another object of the present invention to provide a novel method for fabricating the members of the matrix deflector.

These and other objects of the present invention will become apparent upon consideration of the following detailed description, when taken in conjunction with the drawings.

BRIEF DESCRIPTION OF THE DRAWINGS

FIG. 1 is a perspective view of a prior art matrix deflector assembly;

FIG. 1*a* is a sectional view, taken along lines 1*a*—1*a*, of the prior art matrix deflector assembly of FIG. 1;

FIG. 2 is a perspective view of a matrix deflector assembly in accordance with the principles of the present invention;

FIG. 2*a* is a sectional view, taken along lines 2*a*—2*a*, of the matrix lens assembly of FIG. 2 and illustrating the diverging apertures in the matrix deflector member;

FIG. 3 is a sectional side view illustrating the initial step in fabricating a matrix deflector member in accordance with the principles of the present invention; and FIGS. 4*a*–4*d* are sectional side views illustrating sequential further steps in fabricating a matrix deflector member.

DETAILED DESCRIPTION OF THE INVENTION

Referring initially to FIGS. 1 and 1*a*, a prior art electron-beam matrix deflection assembly 10 comprises matrix deflection members 11 and 12 each having a plurality of slots 14 defined by the facing surfaces of a set of bars 15 formed in members 11 and 12. The members are positioned one atop the other with the bars 15 thereof aligned essentially orthogonal each to the other. Thus, when viewed from above (the direction from whence a focussed electron beam enters the matrix deflectors, as from each lenslet of a "flys-eye" lenslet array) a substantially square aperture is formed through the deflection assembly by the superposition of the slots in each of overlayed members 11 and 12, and is bounded on two sides, e.g. left and right, by the bars 15 of a first member, e.g. top member 11, and on the remaining two opposed sides, e.g. front and back, by the adjacent bars 15 of the remaining member, e.g. lower matrix lens member 12. A layer, coating or film of a conductive material, typically of chromium with a gold flash and the like (as compatible with vacuum systems), is fabricated upon at least the facing surfaces of an adjacent pair of bars to form electrodes 16 parallel to the direction of electron beam travel through each of the deflection apertures formed by each continuous aperture through the overlayed, orthogonal disposed members.

A typical matrix deflector may consist of an array of 18×18 deflection apertures, i.e. 18 apertures cut through the thickness T of each member. Accordingly, for a matrix deflector having an array with N apertures on each side, a total of (N+1) bars 15 are required. Typically, the center-to-center spacing S (FIG. 1) between the bars is on the order of about 60 milli-inches while the thickness T in the area of the bars is selected to give a deflection length, i.e. the depth of slot over which electron beam deflection occurs (as hereinbelow further explained), on the order of 100–150 milli-inches. In the prior art matrix deflection members, slots 14 were machined, via ganged cutters and the like, into a blank of fired ceramic. Machining of such materials, particularly where high tolerance is required, is a difficult and costly process. The cost and difficulty is compounded by the fact that the total member thickness A must be greater than the aperture length T to allow end buttress portions 18 to extend below the bottom of each bar in unbroken manner, for stable support of the members when the lens assembly is fabricated in final form. Because of the additional thickness (A-T) the member must be recessed, as at area 19 below bars 15, by the additional thickness of the member. This requires that the blank from which members 11 or 12 are formed be previously cast with recess 19 and adds to the percentage of members having one or more of bars 15 broken in the slot fabrication process. Thus, fabrication of a matrix deflection member reducing the relatively high cost, occurrence of breakage and difficulty of machining is desirable.

Referring now particularly to FIG. 1*a*, a pair of parallel bars 15*j* and 15*k*, forming a portion of one of the matrix deflection members is illustrated. It should be understood that the members form the j-th and k-th members of a linear array of such members extending leftwardly and rightwardly therefrom, as seen in FIG. 1*a*, and as required by the number of deflection apertures along each side of the array for a particular design. Both members, in this particular configuration, have the entire, substantially square periphery thereof coated with a layer 20 of a conductive material forming the associated deflection electrode. As best seen in FIG. 1, the conductor material upon the top surface of every bar is extended in opposite directions toward one of buttress portions 18 to form lead portions 22; additional conductive coatings 24 may be applied to the surface of the insulating member adjacent the ends of the associated buttress portions 18, and spaced from the remaining conductive portions having their leads 22 directed towards the opposite buttress, to interconnect every other conductive electrode coating, whereby only two leads (not shown) may be brought from each of the pair of matrix deflection members to electronic circuitry, known to the art, and suitable for impressing the proper potentials between facing electrode surfaces for deflecting the electron beam.

In operation, a beam 30 of electrons 32 is directed in the direction of arrow B, i.e. downwardly in FIG. 1*a*, to pass between conductive aperture sides 16*j* and 16*k*. For purposes of illustration, a positive charge is placed upon conductive coating 20 of bar 15*j* whereby aperture side 16*j*; has a positive electrical potential with respect to a negative electrical potential impressed upon opposite aperture side 16*k*. An electric field E is thus formed from aperture side 16*j* to aperture side 16*k*. Beam 30 passes through aperture 14*j* and electrons 32 are deflected leftwardly by interaction with electric field E. For a field E of relatively low magnitude, the beam 30' immerging from the aperture is deflected to a lesser degree than the beam 30" deflected by passage through an aperture 14 having an electric field E of greater magnitude. As may be observed, the edge of beam 30" is such as to intersect a portion of bar 15*j* and conductively-coated surface 16*j* thereof. Thus, the electrons of the deflected beam can impinge upon a bar and may be scattered or otherwise cause the resulting deflected beam to have characteristics deleterious to proper operation of the system in which the deflection assembly is used.

Referring now to FIGS. 2 and 2*a*, a preferred embodiment of my matrix deflection assembly 10' utilizes a pair of deflection members 11' and 12' having a substantially constant thickness T'; an array of apertures 40 is formed, preferably by a method discussed hereinbelow, therethrough with a diverging cross-section. Each slot is formed between a pair of adjacent lens member bars 42, such as slot 40*j* formed between the j-th bar 42*j* and the k-th bar 42*k* (FIG. 2*a*). While only four slots and five bars are shown for member 11' in FIG. 2, it should be understood that this is done for convenience of illustration and that the number of slots is dictated by the number of lenslets along a particular side of an array and, in general, will be somewhat greater than the number of slots shown, in accordance with a particular design. A conductive coating 20' is formed on at least the sides of bars 42 forming the deflection slot, i.e. bar side coatings 44*j* and 44*k* respectively on bars 42*j* and 42*k*. Advantageously, in my preferred embodiment the entire tapazoidal periphery of each of bars 42 is coated with the conductive material, such as the aforementioned gold-flashed chromium. The top surface coating of each bar is extended in one of a pair of opposite directions toward one of end portions 18', to form the portions 22' and additional conductive material bridges 24' may be utilized; the use of conductive bridges 24', to facilitate only a pair of leads being required for connection to the bars of each member, is particularly attractive as each member now has end portions 18' having substantially flat surfaces, whereby metallization of corners and surfaces perpendicularly disposed to one another is not required, as in the prior art embodiment of FIG. 1.

In operation, the beam 50' of electrons 52' is again directed in the direction of arrow B and enters the narrow entrance opening, having an entrance width S', of a slot 40*j* between a pair of adjacent conductively coated bars, e.g. 42*j* and 42*k*. The aperture side walls 44*j* and 44*k* have impressed thereon electrical potentials of opposite polarity and magnitude chosen for the desired beam deflection. For purposes of comparison, side walls 44*j* and 44*k* have respective positive and negative potentials applied thereto of such magnitude as to yield an electric field E' therebetween of substantially the same magnitude as the electric field shown in FIG. 1*a*, an hence the amount of beam deflection is substantially similar. It will be observed that the beam 50" having the greatest desired deflection, does not impinge upon any portion of the bar and associated conductive coatings forming the aperture through which the beam has been directed.

It should be understood that the bars and slots of FIGS. 1*a* and 2*a* are illustrated as running into and out of the plane of the drawing with associated electron beam deflection leftwardly and rightwardly in the plane of the drawing; the orthogonally-disposed remaining matrix deflection member will, accordingly, have its bars and slots disposed leftwardly and rightwardly in the plane of the drawing and above or below the plane of the first member, with the electron beam being deflected in directions into and out of the plane of the drawing whereby X-Y orthogonal coordinate deflection is achieved.

Each deflection member 11′ or 12′ is fabricated from a blank of a photosensitive material, such as Fotoform® glass material from Corning Glass Co. and the like materials. The preferred Fotoform® glass is an insulative material which is photosensitve throughout its volume and, when exposed to ultraviolet light, allows the exposed areas to be "developed" and etched to remove the "developed" material to form an opening in accordance with the pattern of exposure. As seen in FIG. 3, a blank 60 of photosensitive insulating material has a substantially rectangular solid shape and a thickness X′ slightly less than the desired deflection distance T′, to allow for the thickness of the conductive coating. A mask 62 is positioned upon or adjacent a major planar surface 60*a* of the blank. The mask is formed of a material which is opaque to the optical photons which will expose the photosensitive material of blank 60. It should be understood that the blank is normally stored in an environment devoid of light of the wavelengths to which the material is sensitive and that the masking and subsequent steps, up to the actual exposure of the masked blank, is performed under similar conditions.

Mask 62 includes solid areas 62*a* defining the extent of end portions 18′ and the top surfaces of the plurality of parallel bars 42 extending therebetween; a series of substantially parallel slots 62*b* is cut into the mask in accordance with the pattern of slots 40 to be formed through the matrix lens member.

A semicylindrical lens 64, having its semicircular surface 64*a* positioned toward blank surface 60*a*, is positioned above each mask slot 62*b* with the slot centerline and center of curvature of the lens substantially in alignment. A plurality of individual semicylindrical lens members 64 may be utilized or a single member having the surface, closest to blank 60, formed into semicylindrical portions of proper spacing and length may be utilized. A source of light (not shown) of the proper wavelength for exposing the material blank 60, e.g. ultraviolet light for use with the preferred Fotoform® glass, is positioned to project substantially parallel rays 70 of light substantially perpendicular to the top surface 64*b* of each lens 64. The lens radius of curvature R is selected to be greater than the spacing S′ of the aperture to be formed; in practice, the lens diameter D is set substantially equal to the spacing S (on the order of 20–60 milli-inches) between centers of adjacent bars.

Referring now to FIGS. 4*a*–4*d*, the incoming parallel light rays 70 impinge upon lens surface 64*b*, pass through lens 64 and emerge from semicircular surface 64*a* as diverging light rays 70′ (FIG. 4*a*). The diverging light rays are absorbed by masked portions 62*a*, except in the region of mask aperture 62*b*, where the diverging light rays enter and pass through the photosensitive material of blank 60. The exposed volume, of diverging cross section toward blank bottom surface 60*b*, is developed in accordance with the developing procedure for the particular photosensitive material utilized, whereby a plurality of developed portions 75 reside in the undeveloped portions 77 of blank 60 (FIG. 4*b*). The exposed portions are etched by appropriate techniques to form the slot 79 passing through blank 60 and having a lesser dimension at first blank surface 60*a* than at the remaining blank surface 60*b* (FIG. 4*c*). The conductive material coating 20′ is then fabricated upon the surfaces of the etched aperture, and upon the top and bottom surface of the bars, as required, to form the finished matrix lens member (FIG. 4*d*).

There has just been described a novel electron-beam matrix deflection member, method of fabrication and assembly formed thereof, which allows an electron beam to be deflected without the possibility of the beam striking the edge of the deflection members itself at maximum beam deflection angles. The matrix deflection members are relatively easily and cheaply fabricated to a high degree of precision with reduced handling and breakage thereof.

While a preferred embodiment of the present invention has been illustrated herein, many variations and modifications will now become apparent to those skilled in the art. It is my intent, therefore, to be limited solely by the scope of the appending claims and not by the particular embodiment selected for illustration herein.

What is claimed is:

1. A matrix assembly for deflecting an electron beam, comprising:

first and second members of insulating material, each of said first and second members having a pair of spaced-apart and opposed end portions and a plurality of substantially parallel slots formed therethrough to define a plurality of bars extending between said spaced, opposed end portions; each slot having a cross section through said member substantially continuously diverging in a direction of passage of the electron beam therethrough; and an electrical conductive coating fabricated upon at least the diverging walls of each adjacent pair of bars defining one of said slots;

said first and second members being positioned in overlapping parallel planar relationship to one another with the slots thereof mutually orthogonal each to the other and to the direction of passage of said electron-beam therethrough, to define a matrix of apertures.

2. The matrix deflection assembly of claim 1, wherein the conductive coating is fabricated upon substantially all of the trapazoidal periphery of each bar.

3. The matrix deflection assembly of claim 2, wherein the conductive coating of every other bar is connected, in parallel, to a conductive lead portion formed upon one of said member end portions; the remaining conductive coatings being connected, in parallel, to another conductive lead portion formed upon the remaining member end portion.

* * * * *